Patented Oct. 30, 1934

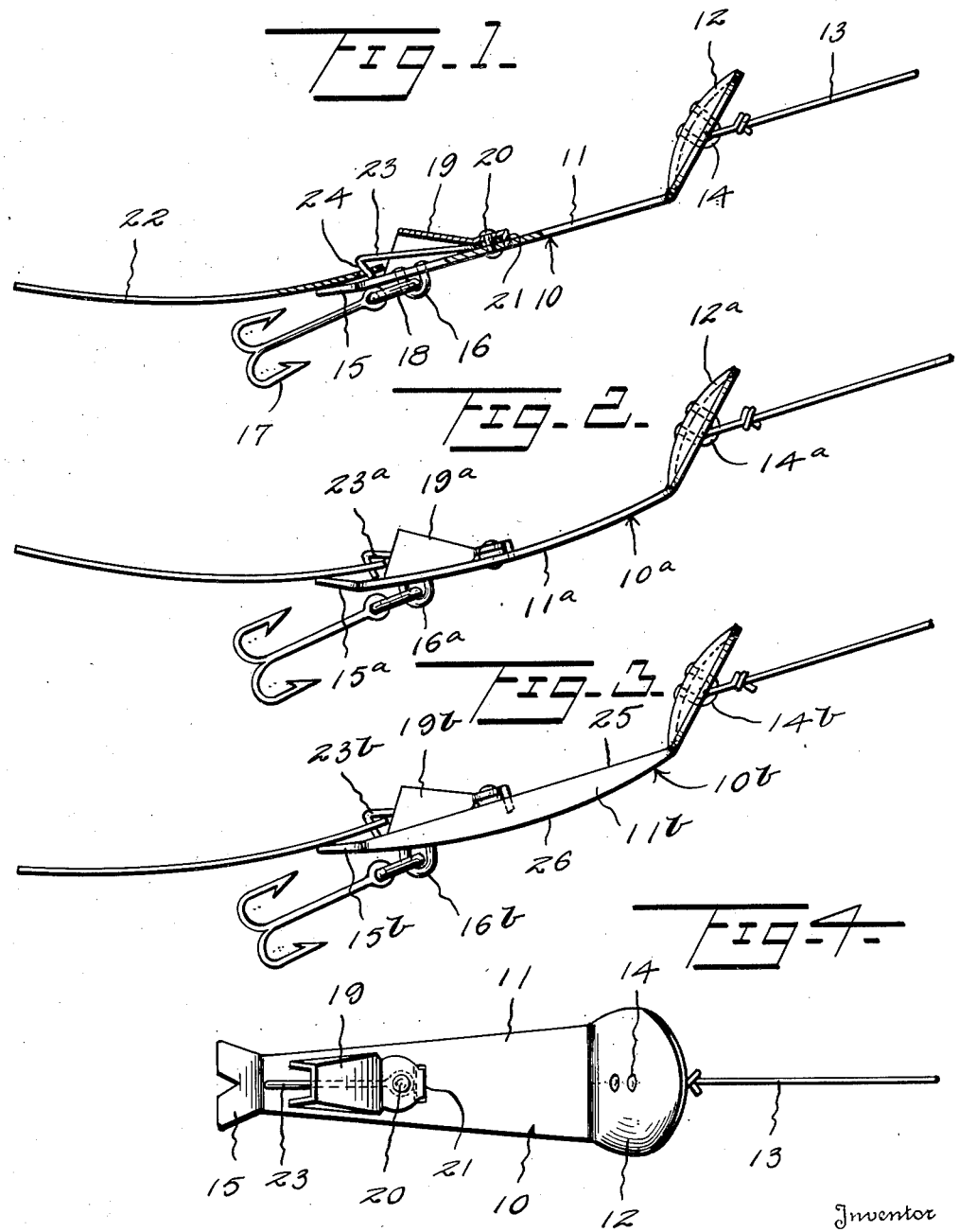

1,978,875

UNITED STATES PATENT OFFICE 1,978,875

ARTIFICIAL BAIT FOR GAME FISH

Joseph D. Wright, Iowa City, Iowa

Application December 16, 1933, Serial No. 702,753

3 Claims. (Cl. 43—42)

This invention relates to artificial bait for use in the catching of game fish or the like.

An object of this invention is to provide a lure or artificial bait which is so constructed that there will not be an undue movement of the bait or lure in the water as the lure moves relative to the water, but there will be a sufficient movement to attract a fish.

Another object of this invention is to provide a lure of this type which will move in a lateral or vertical direction within the water after the manner of a small fish, and which is polished to a degree to attract game fish.

The above and various other objects and advantages of this invention will in part be described and in part be understood from the following detailed description of the present preferred embodiment, the same being illustrated in the accompanying drawing wherein:—

Figure 1 is a detail side elevation partly broken away and in section of a device constructed according to the preferred embodiment of this invention.

Figure 2 is a detail side elevation of a modified form of this invention.

Figure 3 is a detail side elevation of a further modification.

Figure 4 is a top plan view of the disclosure shown in Figure 1.

Referring to the drawing wherein like numerals of reference designate corresponding parts throughout the several views, and particularly to Figure 1, the numeral 10 designates generally the body of a lure which is adapted to be attached to a leader or line 13. The lure or bait member 10 comprises a body 11 which, in the present instance, is an elongated narrow body made out of a sheet of metal and provided at the forward end thereof with an obtusely related cup-shaped head 12. This head 12 is positioned with the concave side thereof directed foremost and an eye or loop 14 is secured in substantially the center of the head 12 and extends forwardly and provides a means for attaching the leader or line 13 to the lure.

The body 11 has a tail 15 integral therewith which is obtusely related to the body 11. An eye 16 is secured to the underside of the body 11, and a hook 17 may be attached to this eye 16 by means of a ring 18. The hook 17 may be either of the single or multiple type of hook. A hollow fin 19 is secured as by a rivet or securing member 20 to the upper side of the body 10 with the open side of the fin 19 directed rearwardly. The fin 19 has a pin or lug 21 integral therewith which extends into the body 11 and coacts with the rivet or pin 20 in preventing turning movement of the fin 19 relative to the body 11.

A flexible tail member 22, in the form of a narrow strip of leather or the like, is adapted to be attached to the lure 10, and in the present instance, the tail piece 22 is secured to a resilient hook 23 which extends longitudinally within the fin 19, and is provided with a forwardly extending bill 24 engaging against the upper side of the body 11.

The forward end of the tailpiece 22 is provided with a suitable hole within which the bill 24 is adapted to engage. In the disclosure shown in Figure 1, the body 11 is straight from end to end with the head 12 and the tail member 15 obtusely related to the body 11. However, this body 11 may also be constructed in longitudinally curved form, as shown in Figure 2, wherein the body 11a has a head 12a integral therewith and disposed on an obtuse angle to the length thereof. The body 11a has a loop or eye 16a on the lower side to which a hook or hooks may be attached, and a housing 19a is disposed on the side of the body opposite from the eye 16a. A spring pressed bill 23a is disposed within the housing 19a, being secured in the same manner as the bill 23 shown in Figure 1. This bill 23a is adapted to receive the desired tailpiece which loosely engages the bill 23a. A tail 15a is integral with the rear end of the body 11a and is disposed rearwardly of the fin or housing 19a. In Figure 3, there is disclosed a further modified form of this lure wherein the body 11b is flat on the upper surface 25 thereof and is curved on the lower surface 26. The body 11b has a fin or housing 19b on the upper or flat side thereof and also has an eye or loop 16b on the lower side to which a hook or hooks may be attached. A resilient bill 23b is disposed in the fin or housing 19b and is secured in the same manner as the bill 23 shown in Figure 1. The rear end of the body 11b terminates in a tail member 15b which is disposed rearwardly of the fin or housing 19b. The bill 23b is adapted to receive a tailpiece which is swingably or loosely secured to the bill 23b. The head of the lure shown in Figure 3 is provided with a loop or eye 14b to which a line may be attached.

In the use of the lure herein disclosed, the hook 17 may be secured to the eye 16 by means of a ring 18 or, if desired, the hook 17 may be fixed to the body 11 so that it will not have movement independently of the movement of the body 11. The eye 14 is adapted to be attached to the leader 13 and the lure drawn through the water or the water moved relative to the lure. Due to the inclination of the head 12, the lure will assume a wiggling and a leaping movement in the water, and this movement will attract any game fish closely adjacent thereto, the fish also being attracted by reason of the polished upper and lower surfaces of the lure 10.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A device as set forth comprising an elongated body, an obtusely disposed cup-shaped head on one end of the body positioned with the concave side thereof foremost, an eye in the concavity of the head, a hook secured to the body adjacent the other end, a fin on the upper side of the body, a tailpiece, and means engaging within the fin for removably securing the tailpiece to the body.

2. A device as set forth comprising an elongated body, an obtusely disposed cup-shaped head on one end of the body positioned with the concave side thereof foremost, an eye in the concavity of the head, a hook secured to the body adjacent the other end, a hollow fin secured to the upper side of the body, a tailpiece, and resilient means engaging within the fin for removably securing the tailpiece to the body.

3. A device as set forth comprising an elongated body, an obtusely disposed cup-shaped head on one end of the body positioned with the concave side thereof foremost, an eye in the concavity of the head, an eye secured to the underside of the body adjacent the other end, a tail member integral with the body and disposed on an acute angle to the length of the body, a hook, means for securing the hook to the second eye, a hollow fin on the upper side of the body, means for securing the fin to the body, means carried by the fin and engaging in the body to hold the fin against turning movement relative to the body, a swingable tailpiece, and yieldable means engaging within the fin to removably secure said tailpiece to the body.

JOSEPH D. WRIGHT.